(12) United States Patent
Sagel et al.

(10) Patent No.: US 10,750,856 B2
(45) Date of Patent: Aug. 25, 2020

(54) CORNER CABINET FITTING FOR THE GEARWHEEL- CONTROLLED MOVABLE MOUNTING OF A SHELF IN A CORNER CABINET

(71) Applicant: Vauth-Sagel Holding GmbH & Co. KG, Brakel (DE)

(72) Inventors: Claus Sagel, Bielefeld (DE); Thomas Sagel, Brakel (DE)

(73) Assignee: VAUTH-SAGEL HOLDING GMBH & CO. KG, Brakel (DE)

( * ) Notice: Subject to any disclaimer, the term of this patent is extended or adjusted under 35 U.S.C. 154(b) by 0 days.

(21) Appl. No.: 16/424,624

(22) Filed: May 29, 2019

(65) Prior Publication Data

US 2019/0274423 A1  Sep. 12, 2019

Related U.S. Application Data

(63) Continuation of application No. PCT/EP2017/080758, filed on Nov. 29, 2017.

(30) Foreign Application Priority Data

Nov. 29, 2016  (EP) .................................... 16201262

(51) Int. Cl.
*A47B 49/00* (2006.01)
*A47B 81/00* (2006.01)
(Continued)

(52) U.S. Cl.
CPC .............. *A47B 46/00* (2013.01); *A47B 57/00* (2013.01); *A47B 81/002* (2013.01);
(Continued)

(58) Field of Classification Search
CPC ...... A47B 46/00; A47B 81/002; A47B 49/006
See application file for complete search history.

(56) References Cited

U.S. PATENT DOCUMENTS 2,885,252 A * 5/1959 Doesken .............. A47B 49/008
312/319.2
3,863,279 A * 2/1975 Stalder .................. A47B 53/00
5/8
(Continued)

FOREIGN PATENT DOCUMENTS

CN       204691518       10/2015
DE    20 2004 011 200 U1    1/2006
(Continued)

OTHER PUBLICATIONS

International Preliminary Report on Patentability in co-pending related PCT Application No. PCT/EP2017/080758, dated Jun. 4, 2019.

*Primary Examiner* — Kimberly S Wright
(74) *Attorney, Agent, or Firm* — Thomas | Horstemeyer, LLP

(57) ABSTRACT

A corner cabinet fitting (1) for movably mounting of a shelf (34) in a corner cabinet (37) has a bearing pedestal (7), a supporting arm (8) which is mounted on the bearing pedestal (7) so as to be pivotable in a first pivoting movement about a first vertical pivot axis (9), a shelf carrier (10) which is mounted on the supporting arm (8) so as to be pivotable in a second pivoting movement about a second vertical pivot axis (11), and a coupling mechanism which couples the second pivoting movement to the first pivoting movement. The coupling mechanism comprises a first rolling element (24) and a second rolling elements (22), which roll on one another directly or via a belt or a chain, the first rolling element (24) being coupled to the bearing pedestal (7) and the second rolling element (22) being coupled to the shelf carrier.

20 Claims, 14 Drawing Sheets

(51) Int. Cl.
*A47B 46/00* (2006.01)
*A47B 57/00* (2006.01)
*F16H 19/00* (2006.01)
*F16H 21/44* (2006.01)
*F16H 51/00* (2006.01)

(52) U.S. Cl.
CPC ......... *F16H 19/001* (2013.01); *F16H 19/005* (2013.01); *F16H 21/44* (2013.01); *F16H 51/00* (2013.01)

(56) References Cited

U.S. PATENT DOCUMENTS

| | | | | |
|---|---|---|---|---|
| 5,752,756 | A * | 5/1998 | Compagnucci | A47B 49/004 312/238 |
| 5,941,620 | A * | 8/1999 | Weber | A47B 81/002 312/238 |
| 7,137,797 | B2 * | 11/2006 | Krayer | A47B 11/00 418/150 |
| 7,318,631 | B2 * | 1/2008 | Kreyenkamp | A47B 81/002 312/238 |
| 8,911,035 | B2 * | 12/2014 | Kopnick | A47B 81/002 312/238 |
| 9,277,812 | B2 * | 3/2016 | Bennett | A47B 81/00 |
| 10,092,094 | B2 * | 10/2018 | Sagel | A47B 49/006 |
| 2002/0117943 | A1 * | 8/2002 | Gerkey | A47B 49/006 312/238 |
| 2005/0196310 | A1 * | 9/2005 | Krayer | A47B 11/00 418/61.3 |
| 2005/0200251 | A1 * | 9/2005 | Stone, III | A47B 46/00 312/351.1 |
| 2006/0012273 | A1 * | 1/2006 | Kreyenkamp | A47B 81/002 312/238 |
| 2007/0262682 | A1 * | 11/2007 | Gunter | A47B 81/002 312/238 |
| 2008/0122330 | A1 * | 5/2008 | Yang | A47B 81/002 312/307 |
| 2011/0193455 | A1 * | 8/2011 | Kreyenkamp | A47B 81/002 312/238 |
| 2012/0049708 | A1 * | 3/2012 | Kopnick | A47B 81/002 312/238 |
| 2014/0147200 | A1 * | 5/2014 | Baro | A47B 49/006 403/382 |
| 2018/0049545 | A1 * | 2/2018 | Sagel | A47B 81/002 |

FOREIGN PATENT DOCUMENTS

| | | | |
|---|---|---|---|
| DE | 102005007740 | * | 8/2006 |
| DE | 10 2006 055 806 | A1 | 5/2008 |
| DE | 11 2011 102 299 | T5 | 7/2013 |
| DE | 20 2015 102 233 | U1 | 9/2016 |
| EP | 1 925 238 | B1 | 8/2009 |
| EP | 2 353 436 | B1 | 11/2012 |
| EP | 3 090 654 | B1 | 4/2016 |

* cited by examiner

CORNER CABINET FITTING FOR THE GEARWHEEL- CONTROLLED MOVABLE MOUNTING OF A SHELF IN A CORNER CABINET

CROSS REFERENCE TO RELATED APPLICATIONS

This application is a continuation to International Application PCT/EP2017/080758 with an international filing date of Nov. 29, 2017 entitled "Corner cabinet fitting for the gearwheel-controlled movable of a shelf in a corner cabinet" and claiming priority to European Patent Application No. EP 16 201 262.9 entitled "Beschlag zur zahnradgesteuerten beweglichen Lagerung eines Tablars in einem Eckschrank", filed on Nov. 29, 2016, and now abandoned.

FIELD OF THE INVENTION

The invention relates to a corner cabinet fitting for movably mounting a shelf in a corner cabinet.

Particularly, the invention relates to a corner cabinet fitting comprising a bearing pedestal, a supporting arm which is mounted to the bearing pedestal such as to be pivotable in a first pivoting movement about a first vertical pivot axis, a shelf carrier which is mounted to the supporting arm such as to be pivotable in a second pivoting movement about a second vertical pivot axis, and a coupling mechanism which couples the second pivoting movement to the first pivoting movement.

BACKGROUND OF THE INVENTION

In this entire description and the appending claims the term "corner cabinet" is a synonym for a cabinet whose interior is not accessible over its entire width through a door opening so that shelves which can be pushed in the cabinet for storing objects and which can be pulled out of the cabinet for providing access to the objects may not be made as simple drawers extending over the entire width of the cabinet. Instead, a shelf which essentially extends over the width of such a cabinet has to be guided through the door opening in a non-linear movement. If this non-linear movement is restricted to a pivoting movement of the shelf about a vertical pivot axis with regard to a bearing pedestal supported in the front middle of the corner cabinet at a supporting column, the respective shelf can be pivoted through the door opening out of the corner cabinet by nearly half of its surface area at maximum. To be able to guide the shelf farther outside in front of the door opening it may not be rigidly but has to be movably mounted to a supporting arm which is pivotable about such a pivot axis. This movability may in general be a horizontal shiftability and/or a further pivotability about a second vertical pivot axis with regard to the support arm. The present invention relates to fittings in which the shelf is mounted to the supporting arm such as to be pivotable about such a second vertical pivot axis, wherein the position of this pivot axis is arranged at a fixed point on the supporting arm.

When the shelf is movably mounted to the supporting arm, this movement has to be coupled to the pivoting movement of the supporting arm about the vertical pivot axis in the front middle of the corner cabinet such that the moving shelf does not collide with the body of the corner cabinet. To this end, different approaches are known.

German utility model DE 20 2004 011 200 U1 and U.S. Pat. No. 7,318,631 B2 belonging to the same patent family teach to additionally support the respective shelf at a second supporting arm which is mounted at that side of the door opening opposing the supporting column such as to be pivotable about a third vertical pivot axis, and at whose free end the shelf is supported such as to be pivotable about a fourth vertical pivot axis. At the underside of the shelf, the fourth vertical pivoting axis is arranged at a distance to the second vertical pivoting axis, about which the shelf is supported at the free end of the first supporting arm in a pivotable way. Supported and guided by both supporting arms, the shelf can be pulled out of the corner cabinet through the door opening in a S-shaped movement, wherein the maximally pulled out position of the shelf is partially located besides the corner cabinet. This is unfavorable with regard to the accessibility of the parts of the shelf which cannot be completely pulled out of the corner cabinet. Further, this known corner cabinet fitting needs additional sufficiently stable supporting points at the sidewall of the corner cabinet delimiting the door opening. Further, the possible surface area of the shelf, as compared to the base area of the corner cabinet is comparatively small, particularly in the middle of the shelf which has to be guided around the front edge of the sidewall delimiting the door opening, and which has a narrowing for this purpose.

From German patent application publication DE 10 2006 055 806 A1 and European patent EP 1 925 238 B1 belonging to the same patent family, a corner cabinet fitting is known, in which the respective shelf is supported via two supporting arms which are mounted to a single bearing pedestal such as to be pivotable about vertical pivot axes running in the front middle of the corner cabinet. Here, the shelf is not only mounted to the supporting arms such as to be pivotable about two further pivot axis but the supporting points of the shelf at the supporting arms are also movable along the supporting arms. The movability of the connection points along the supporting arms are coupled to the pivoting movements of the supporting arms about their vertical pivot axes by a coupling mechanism including control levers and sliding tracks. The known corner cabinet fitting has a very complex construction, and, due to the basically present degrees of freedom of movement of the shelf with regard to the supporting arms, it is low in stability of movement guiding. Further, the possible surface area of the shelf is comparatively small as compared to the base area of the corner cabinet. The possible surface area is limited to two adjacent circular areas.

A corner cabinet fitting comprising the features of the preamble of independent claim 1 is known from European patent EP 2 353 436 B1 and U.S. Pat. No. 8,911,035 B2 belonging to the same patent family, and from German utility model DE 20 2015 102 233 U1 and European patent EP 3 090 654 B1 belonging to the same patent family. A supporting arm is mounted to a bearing pedestal such as to be pivotable about a first spatially fixed vertical pivot axis, the bearing pedestal being supported at a vertical supporting column in the front middle of the corner cabinet. A shelf carrier to which the shelf is fastened is mounted to the supporting arm such as to be pivotable about a second vertical pivot axis. A control lever is mounted with its one end to the bearing pedestal such as to be pivotable about a further spatially fixed vertical pivot axis, and with its other end, in a pivotable way, to a cantilever of the shelf carrier extending backwards beyond the second vertical pivot axis. The supporting arm, the bearing pedestal, the control lever and the cantilever form a lever gearing which couples the pivoting movement of the shelf carrier with regard to the supporting arm to the pivoting movement of the supporting arm with regard to the bearing pedestal. The shelf fastened to the shelf carrier is thus guided into a pulled out position which is by far predominantly outside of the corner cabinet and in front of its door opening. As compared to the base area of the respective corner cabinet, the possible size of the shelf is, however, comparatively small even with this known corner cabinet fitting. Further, due to the small distance between the spatially fixed vertical pivot axes of the supporting arm and of the control lever, high forces on the control lever and its bearings come about.

An apparatus for holding a display is known from German publication DE 11 2011 102 299 T5 of an international application having the international publication number WO 2012/006 593 A2. The apparatus comprises a base part, a first arm which is pivotable about a first vertical pivot axis with regard to the base part, a second arm which is pivotable about a second vertical pivot axis with regard to the first arm, and a display fastening bracket which is pivotable about a third vertical pivot axis with regard to the second arm. A pivoting area of the first arm with regard to the base part and a pivoting area of the second arm with regard to the first arm are each delimited to 180° by means of stops. A gearing mechanism comprising a first gearwheel which is limited to 180° rotatable with regard to the base part, a toothed belt and a second gearwheel rigidly coupled to the second arm is provided to orientate the second pivoting area over which the second arm is pivotable with regard to the first arm in a fixed way with regard to the base part. The second arm is made as a parallelogram lever arrangement to support the display fastening bracket at the first arm such as to be movable in height direction at a fixed orientation with regard to the horizontal.

There still is a need of a corner cabinet fitting for movably mounting a shelf in a corner cabinet, which, as compared to the base area of the corner cabinet, guides a large shelf far in front of the door opening of the corner cabinet, and which is nevertheless of limited complexity.

SUMMARY OF THE INVENTION

The present invention relates to a corner cabinet fitting for movably mounting a shelf in a corner cabinet. The corner cabinet fitting comprises a bearing pedestal, a supporting arm mounted to the bearing pedestal such as to be pivotable in a first pivoting movement about a first vertical pivot axis, a shelf carrier mounted to the supporting arm such as to be pivotable in a second pivoting movement about a second vertical pivot axis, and a coupling mechanism which couples the second pivoting movement to the first pivoting movement. The coupling mechanism includes a first rolling element and a second rolling element, which roll on one another either directly or via a belt, a chain or a rod, the first rolling element being coupled to the bearing pedestal, and the second rolling element being coupled to the shelf carrier.

Further, the present invention relates to a corner cabinet comprising a cabinet body, a corner cabinet fitting including at least one fitting unit, and at least one shelf fastened to a shelf carrier of the at least one fitting unit. The at least one fitting unit includes a bearing pedestal, a supporting arm mounted to the bearing pedestal such as to be pivotable in a first pivoting movement about a first vertical pivot axis, the shelf carrier mounted to the supporting arm such as to be pivotable in a second pivoting movement about a second vertical pivot axis, and a coupling mechanism which couples the second pivoting movement to the first pivoting movement. The coupling mechanism of the at least one fitting unit includes a first rolling element and a second rolling element, which roll on one another either directly or via a belt, a chain or a rod, the first rolling element being coupled to the bearing pedestal, and the second rolling element being coupled to the shelf carrier.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
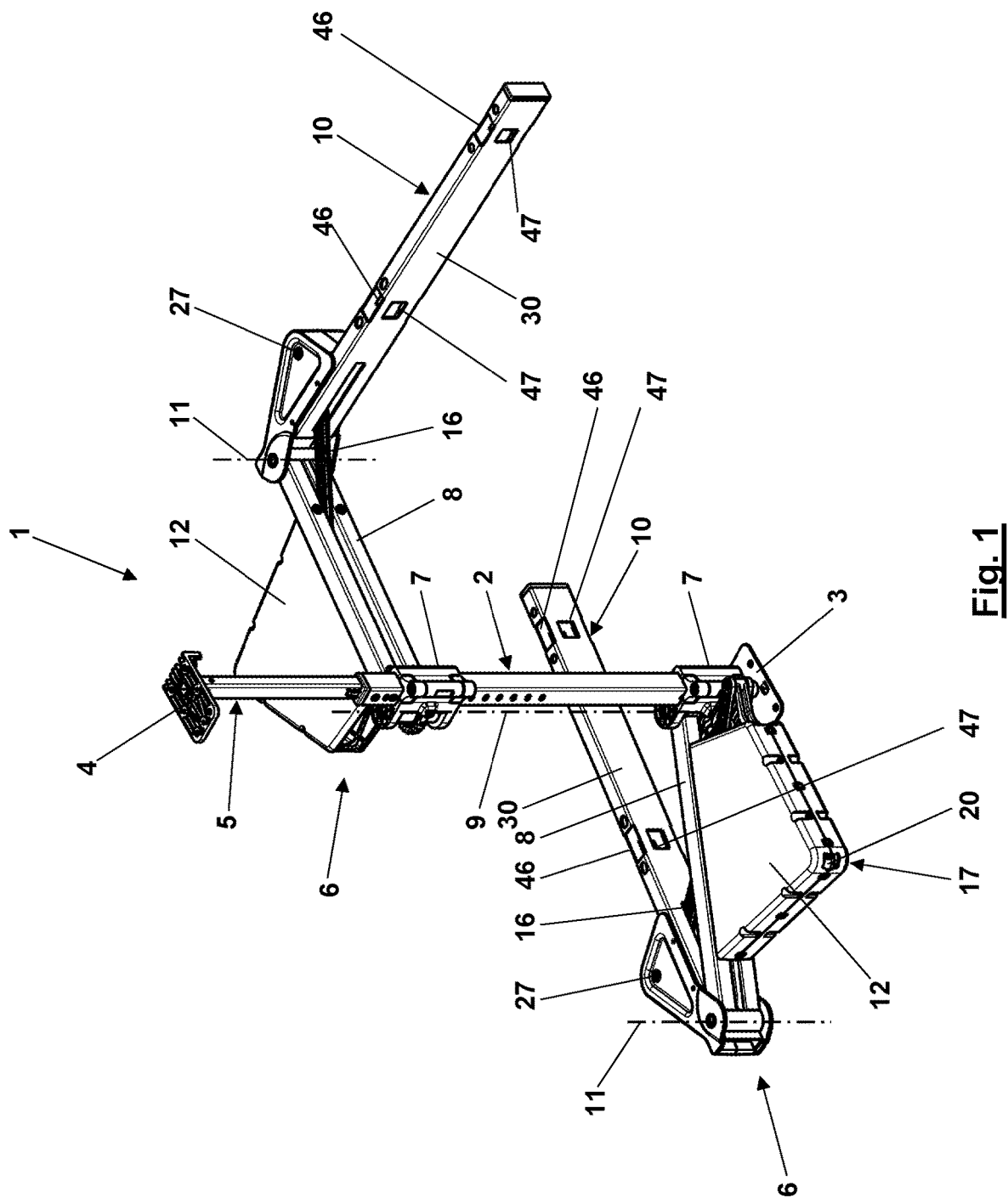
FIG. 1 is a perspective view of a corner cabinet fitting according to the invention comprising two fitting units each including a bearing pedestal, a supporting arm and a shelf carrier, and each for supporting a shelf at a different height at a supporting column such that it can be pulled out, wherein the one fitting unit is depicted in the pushed-in state and the other fitting unit in a pulled-out state.

In a corner cabinet fitting for movably mounting a shelf in a corner cabinet, wherein the corner cabinet fitting has a bearing pedestal, a supporting arm mounted to the bearing pedestal such as to be pivotable in a first pivoting movement about a first vertical pivot axis, a shelf carrier mounted to the supporting arm such as to be pivotable in a second pivoting movement about a second vertical pivot axis, and a coupling mechanism coupling the second pivoting movement to the first pivoting movement, the coupling mechanism comprises two rolling elements which roll on one another and of which one rolling element is coupled to the bearing pedestal and the other rolling element is coupled to the shelf carrier.

Insofar as, in the definition of the corner cabinet fitting, it is stated that one of its parts is mounted to another of its parts such as to be pivotable about a pivot axis this generally means that the respective pivot axis is spatially fixed with regard to the other part and that the mounting of the one part to the other part has no further intended degree of freedom than the pivotability about the indicated pivot axis. Correspondingly, the first vertical pivot axis is spatially fixed with regard to the bearing pedestal, and the supporting arm is only movable with regard to the bearing pedestal by pivoting about this pivot axis. In a same way, the second vertical pivot axis is spatially fixed with regard to the supporting arm, and the shelf carrier is only movable with regard to the supporting arm by pivoting about this second vertical pivot axis.

The two rolling elements of the coupling mechanism which couples the second pivoting movement about the second pivoting axis to the first pivoting movement about the first pivoting axis may roll on one another either directly or indirectly. In directly rolling on one another, the two rolling elements are in direct contact. In indirectly rolling on one another, a belt, a chain or a rod on which both the one and the other rolling element roll on is running between them. Examples of rolling elements include toothed disc segments. When these rolling elements directly roll on one another, this is called engaging of the toothed disc segments. In indirectly rolling of the toothed disc segments on one another, a toothed belt, a chain or a toothed rod may run between them, which is engaged by both toothed disc segments.

That the one rolling element is coupled to the bearing pedestal and the other rolling element is coupled to the shelf carrier, respectively, means that a torque exerted on the one rolling element with rolling of the rolling elements on one another is directly or indirectly supported at the bearing pedestal and that a torque exerted on the other rolling element with rolling of the rolling elements on one another is directly or indirectly supported at the shelf carrier.

By means of the rolling elements rolling on one another, a transmission ratio and/or a reversal of the moving direction can be introduced in the coupling mechanism coupling the two pivoting movements without high loads on bearings of its mechanism elements. Particularly, with the help of the coupling mechanism including the rolling elements, it is manageable to better couple the two pivoting movements to each other for fulfilling the purpose of moving the shelf on the shelf carrier outside far in front of the door opening of the corner cabinet without having to accept massive restrictions with regard to the size of the shelf as compared to the base area of the corner cabinet.

In an embodiment of the corner cabinet fitting, the one rolling element is rigidly connected to the bearing pedestal, and the other rolling element is mounted to the supporting arm such as to be pivotable about a vertical rolling axis. Correspondingly, no movable bearing but just a rigid support has to be provided between the one rolling element and the bearing pedestal. Particularly, the rolling element may be a rigid part of the bearing pedestal. Thus, in the corner cabinet fitting it is only necessary to provide a single movable bearing for the supporting arm at the bearing pedestal. The second rolling element is already mounted to the supporting arm. Correspondingly, in the first pivoting movement of the supporting arm about the first vertical pivot axis the distance of the second vertical pivoting axis to a connection point of the coupling mechanism to the bearing pedestal is not altered. In the corner cabinet fitting known from EP 2 353 436 B1 such an alteration of the corresponding distance inhibits a movement of the shelf far in front of the door opening of the corner cabinet.

In the corner cabinet fitting, a control lever may be hinged with its one end to a first hinge point which together with the other rolling element pivots about the rolling axis of the other rolling element, whereas the control lever with its other end is hinged to a second hinge point which together with the shelf carrier pivots about the second pivot axis. That the two hinge points pivot together with the other rolling element about the rolling axis and the shelf carrier about the second pivot axis, respectively, may particularly mean that the control lever is hinged at its one end to a lever element including the other rolling element and at its other end to the shelf carrier. At least, the control lever, at each of its ends, is hinged to a part which, with mounted corner cabinet fitting, is fixed for rotation with the other rolling element about its rolling axis and with the shelf carrier about the second rolling axis, respectively. Due to the control lever, the coupling mechanism of the corner cabinet fitting comprises a four joint arrangement in which the four joints are the two hinge points of the control lever, the pivot bearing in which the shelf carrier is mounted to the supporting arm such as to be pivotable about the second vertical pivot axis, and a pivot bearing via which the other rolling element is mounted to the supporting arm such as to be pivotable about its rolling axis. This four joint arrangement is coupled to the first pivoting movement of the supporting arm about the first vertical pivot axis by means of the rolling elements rolling on one another.

In the corner cabinet fitting, the control lever may cross the supporting arm such that its second hinge point is on the same side of the second vertical pivot axis as the shelf carrier extending away from the second vertical pivot axis. The crossing control lever may extend through an opening in the supporting arm. In this way, the control lever may be guided with regard to the supporting arm. Further, a control lever arranged in a horizontal longitudinal middle plane of the corner cabinet fitting is a good basis for the formation of a corner cabinet fitting with right and left usability. With regard to this aspect, the control lever, up to the second hinge point, may also extend through a further opening in a main beam of the shelf carrier, if this second hinge point is arranged behind the main beam of the shelf carrier when from a point of view of the supporting arm. This arrangement of the second hinge point of the control lever allows for a comparatively long design of the control lever despite its connection to the second rolling element and thus for a particularly long pivot working path of the control lever between the maximally pivoted-in position of the shelf carrier or a shelf fastened thereto and the maximally pivoted-out position of the shelf carrier or a shelf fastened thereto.

In another embodiment of the corner cabinet fitting, a control lever is provided which neither crosses the supporting arm nor the main beam of the shelf carrier. Instead, the control lever is hinged to an extension of the main beam of the shelf carrier, which extends beyond the second vertical pivot axis, and to a third rolling element or a hinge point rotating therewith about a further rolling axis. Here, the reversal of the pivoting direction which is caused by the crossed course of the control lever and the supporting arm in the embodiment of the corner cabinet fitting described above, is achieved by a further rolling element rolling on the other rolling element. The coupling mechanism of the corner cabinet fitting, which couples the two pivoting movements may also generally comprise more than two rolling elements.

Generally, a length of the control lever between its hinge points may 0.5 to 2 times be a length of the supporting arm between the rolling axis of the other rolling element and the second pivoting axis. The entire length of the supporting arm between the first and the second vertical pivoting axis is, as a rule, longer than this measure of comparison for the control lever. The control lever between its hinge points may at least be longer than the supporting arm between the rolling axis of the other rolling element and the second pivoting axis. Particularly, it may be by up to 20% longer than this measure of comparison.

A distance of the first hinge point of the control lever to the rolling axis of the other rolling element may be 0.5 to 2 times a distance of the second hinge point of the control lever to the second vertical pivot axis. The second one of these measures, i.e. the distance between the second hinge point of the control lever to the second pivot axis may higher, for example by about 50%, than the first measure, i.e. the distance of the first hinge point of the control lever to the rolling axis of the other rolling element.

The supporting arm between the rolling axis of the other rolling element and the second pivot axis may be 2 to 5 times as long as the distance of the first hinge point of the control lever to the rolling axis of the other rolling element. This means that the supporting arm between the rolling axis of the other rolling element and the second pivot axis as well as the control lever between its hinge points are clearly longer than the distance of the first hinge point of the control lever to the rolling axis of the other rolling element. In that the control lever between its hinge points is 2 to 5 times as long as the distance of its second hinge point to the second vertical pivot axis, the control lever between its hinge points and also the supporting arm between the rolling axis of the other rolling element and the second pivot axis are clearly longer than the distance of the second hinge point of the control lever to the second pivot axis.

The distance of the first hinge point of the control lever to the rolling axis of the other rolling element may be longer than a radius of the other rolling element from its rolling axis. In this way it is achieved that the circumferential path over which the first hinge point of the control lever is pivoted with regard to the supporting arm is longer than the circumferential path which is covered by the rolling element, i.e. by its rolling surface with regard to the supporting arm. Particularly, the distance of the first hinge point of the control lever to the rolling axis of the other rolling element may be by 50 to 200% longer than or about 2 times as long as the radius of the other rolling element from its rolling axis.

As compared to the one rolling element, the other rolling element may have a radius from its rolling axis which is by up to 200% longer than a radius of the one rolling element from the first vertical pivot axis. In this way it is achieved that the angular velocity at which the other rolling element is pivoted about its rolling axis with regard to the supporting arm is reduced as compared to the angular velocity at which the supporting arm is pivoted about the first pivot axis. In this way, the angular velocity of the second pivoting movement with regard to the first pivoting movement may also be reduced. Particularly, however, the first hinge point of the control lever, which is spatially fixed in the corner cabinet fitting known from EP 2 353 436 B1, is made to follow in the direction towards the door opening of the corner cabinet at an angular velocity which is reduced as compared to the first pivoting movement. This may be the essential reasons why, with the corner cabinet fitting, the respective shelf can be moved outside particularly far in front of the door opening of the corner cabinet. The other rolling element may have a by 20 to 100% or about 50% longer radius from its rolling axis than the one rolling element from the first vertical pivot axis.

In a most simple but also advantageous case, both rolling elements have a constant radius. Generally, the radiuses of the two rolling elements may also vary over their rolling movement on one another. Despite the fixed distance of the rolling axis of the other rolling element and the first pivot axis about which the rolling axis is pivoted with regard to the bearing pedestal this is possible without problem. With varying radiuses, the first pivoting movement in the second pivoting movement may be adjusted at an even higher level of detail to the geometric free space within the corner cabinet and through its door opening over the entire pull out movement of the shelf carrier or the shelf.

As already remarked, the rolling elements may be toothed disc segments or gearwheel segments which engage each other.

The corner cabinet fitting may have a linear spring and/or damping device which with its one end is hinged to a third hinge point pivoted with the support arm about the first pivot axis, and which with its other end is hinged to a fourth hinge point pivoting together with the other rolling element about the rolling axis of the other rolling element. If then a distance between the third and the fourth hinge point during the first pivoting movement gets through an extremum and reaches local extrema of opposite signs at the ends of the first pivot movement, the linear spring and/or damping device is used for a dampened self-drawing both in the completely pushed-in and in the completely pulled-out position of the shelf carrier or the shelf fastened thereto.

The linear spring or damping device may essentially be oriented horizontally and arranged in a housing attached to the supporting arm together with the other rolling element. As a result, the essential moving parts of the corner cabinet fitting are enclosed by the housing. Thus, entry of objects or even body parts of a user between these parts is inhibited. Further, the housing provides for a closed optical appearance of the corner cabinet fitting. If, in the corner cabinet fitting, the third hinge point, in at least one pushed-in basic position of the corner cabinet fitting, is by at least 2 mm higher or can be raised by at least 2 mm above the fourth hinge point, a generally known oil dampened gas spring can be used as the linear spring and/or damping device at an optimum efficiency. Such oil dampened gas springs are ideally built in with an at least small permanent inclination.

The bearing pedestal may be supported at a vertical supporting column of the corner cabinet fitting, and it may be clamped to this supporting column at different heights. Here, bore holes in the supporting column may define discrete heights at which the bearing pedestal can be clamped.

For securely supporting the respective shelf, the shelf carrier comprises a plurality of shelf rests arranged at a distance with regard to each other. One of the shelf rests may be made as a fixed bearing which is fixed at the shelf carrier, whereas all other shelf rests are made as floating bearings movable in a longitudinal direction of the shelf carrier. By means of these floating bearings tolerances unavoidably occurring in longitudinal direction between the shelf and the shelf carrier are compensated. In vertical direction and transverse to the longitudinal direction of the shelf carrier, however, even the floating bearings support the shelf at the shelf carrier without play. The fixed bearing and the floating bearing may each have equal snap-in protrusions at the shelf rests which releasably snap-in at the shelf carrier in vertical direction. The nature of the respective bearing as a fixed bearing or a floating bearing may be defined by vertical guiding bolts at the shelf rests which engage into vertical guiding holes in the shelf carrier, wherein the guiding holes in the fixed bearing are round holes, and the guiding holes in the floating bearing are elongated holes extending in the longitudinal direction of the shelf carrier.

A corner cabinet comprising a corner cabinet fitting may comprise not only one fitting unit including a bearing pedestal, a supporting arm and a shelf carrier but several such fitting units. Typically two such fitting units are arranged one above the other at the supporting column and two shelves are movably mounted by means of these two fitting units.

Now referring in greater detail to the drawings, the corner cabinet fitting 1 depicted in FIG. 1 serves for mounting of two shelves, not depicted here, in a corner cabinet, also not depicted here, such that the shelves can be moved, i.e. pulled out. The corner cabinet fitting 1 includes a supporting column 2 which has to be fixed in the front middle of the corner cabinet next to its door opening. For this purpose, the supporting column 2 has a base plate and a top plate 4 at a partial column 5 which can be telescoped upwards. For each of the two shelves, a fitting unit 6 is supported at the supporting column 2. Each of the two fitting units 6 includes a bearing pedestal 7 which is clamped to the supporting column 2, a supporting arm 3 which is mounted to the bearing pedestal 7 such as to be pivotable about a first vertical pivot axis 9, and a shelf carrier 10 which is mounted to the supporting arm 8 such as to be pivotable about a second vertical pivot axis 11. The pivoting movement of the supporting arm 8 about the first pivot axis 6 with regard to the bearing pedestal 7 is coupled to the pivoting movement of the shelf carrier 10 about the second vertical pivot axis 11 via a coupling mechanism which is here concealed inter alia by a housing 12. This means that, despite these two pivot-abilities, each pivot position of the supporting arm about the pivot axis 9 is assigned to one pivot position of the supporting arm 10 about the pivot axis 11. FIG. 1 shows, in the fitting unit 6 mounted to the supporting column 2 at the bottom, a maximally pivoted-in pivot position or a maximally pushed-in position in which a shelf mounted to the supporting arm 8 is completely arranged in the respective corner cabinet, and, in the fitting unit 6 at the top, a maximally pivoted-out pivot position or a maximally pulled-out position in which a shelf 35 mounted to the shelf carrier 10 is arranged outside the corner cabinet in front of its door opening to maximum extent.

Figure 2:
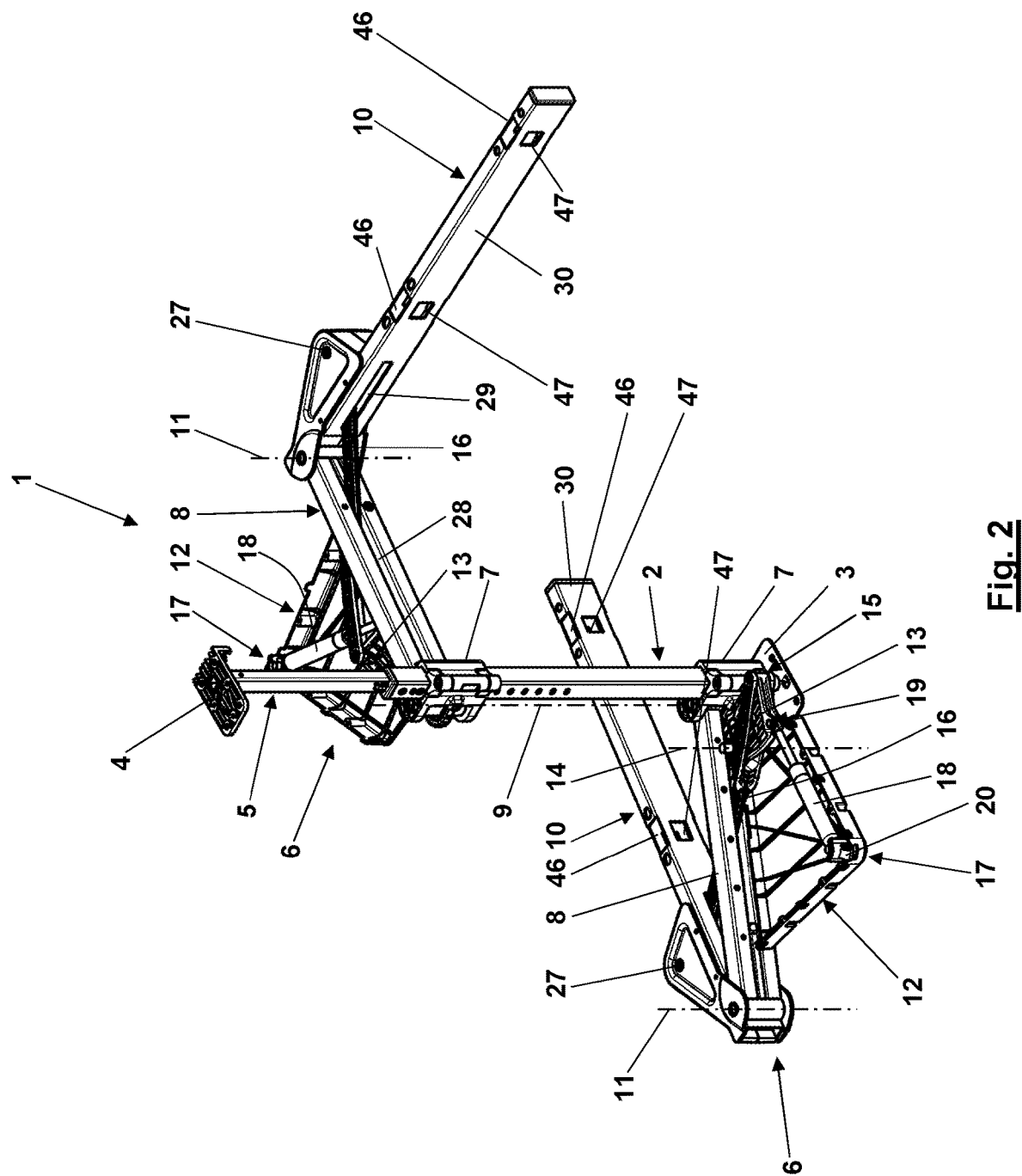
FIG. 2 is a view corresponding to FIG. 1 of generally the same corner cabinet fitting, in which housings of the two fitting units are opened to show their parts located therein.

The depiction of the corner cabinet fitting 1 with opened housings 12 in FIG. 2 allows to see the content of the housing 12. In each of the housings 12 fixed to the associated supporting arm 8, a lever element 13 is mounted such as to be pivotable about a vertical rolling axis 14 which is spatially fixed with regard to the supporting arm 8. To the lever element 13, in a first hinge point 15, a fork-shaped end of a control lever 16 is hinged which, with its other end, is hinged to a hinge point 27, the hinge point 27 being located on a side of a main beam 30 of the shelf carrier 10 facing away from the hinge point 15, and the hinge point 27 being spatially fixed with regard to the shelf carrier 10. From its hinge point 15 to its hinge point 17, the control lever 16 extends through an opening 28 in the supporting arm 8 and an opening 29 in the main beam 30 of the shelf carrier 10. For forming the opening 28, the supporting arm 8 is made of two square-type tubes welded to sleeves at their ends. Two metal sheets are welded to the main beam 30 of the shelf carrier 10, which at the same time provide for a pivot bearing having the pivot axis 11 between the supporting arm 8 and the shelf carrier 10, and at which the second hinge point 27 of the control lever 16 is formed. Further, in a third hinge point 17 which is spatially fixed with regard to the supporting arm 8, an end of a gas spring 18 with oil dampening when reaching its maximum pull-out length, which, with its other end, is hinged to a fourth hinge point 19 at the lever element 13. The gas spring 18 reaches its maximum pull-out length between the hinge points 17 and 19 in the maximally pivoted-in and pivoted-out pivot positions of the fitting units 6 depicted in FIGS. 1 and 2. In between, the pull-out length goes through a local minimum. Thus, the gas spring 18 stabilizes the fitting units 6 in their two end positions and at the same time dampens the fitting unit 6 when running into these end positions. Each hinge point 17 is slightly raised in position as compared to the hinge point 16. For this purpose, an adjusting element 20 is pushed upwards so that the built-in position of the gas spring 18 is slightly inclined, which may be advantageous for the secure function of its oil dampening. FIG. 2 shows the formation of a four-joint arrangement with the hinge points 15 and 17 of the control lever 16, the rolling axis 14 of the lever element 13 and the second vertical pivot axis 9. FIG. 2, however, does not show how this four-joint arrangement is coupled to the pivoting movement of the supporting arm 8 about the first vertical pivot axis 9.

Figure 3:
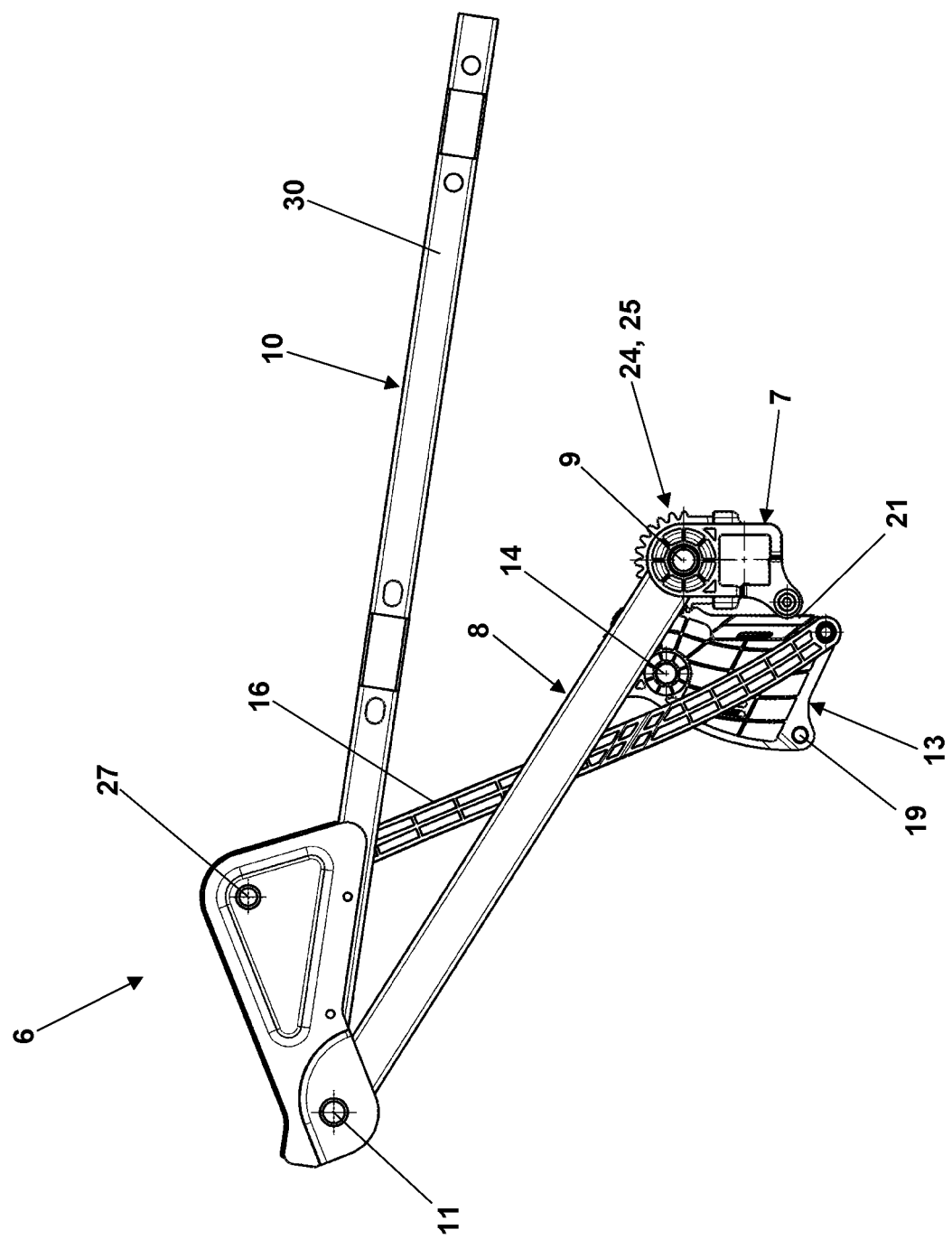
FIG. 3 is a top view of a pivoted-in fitting unit according to FIGS. 1 and 2, completely without depiction of the housing.
Figure 4:
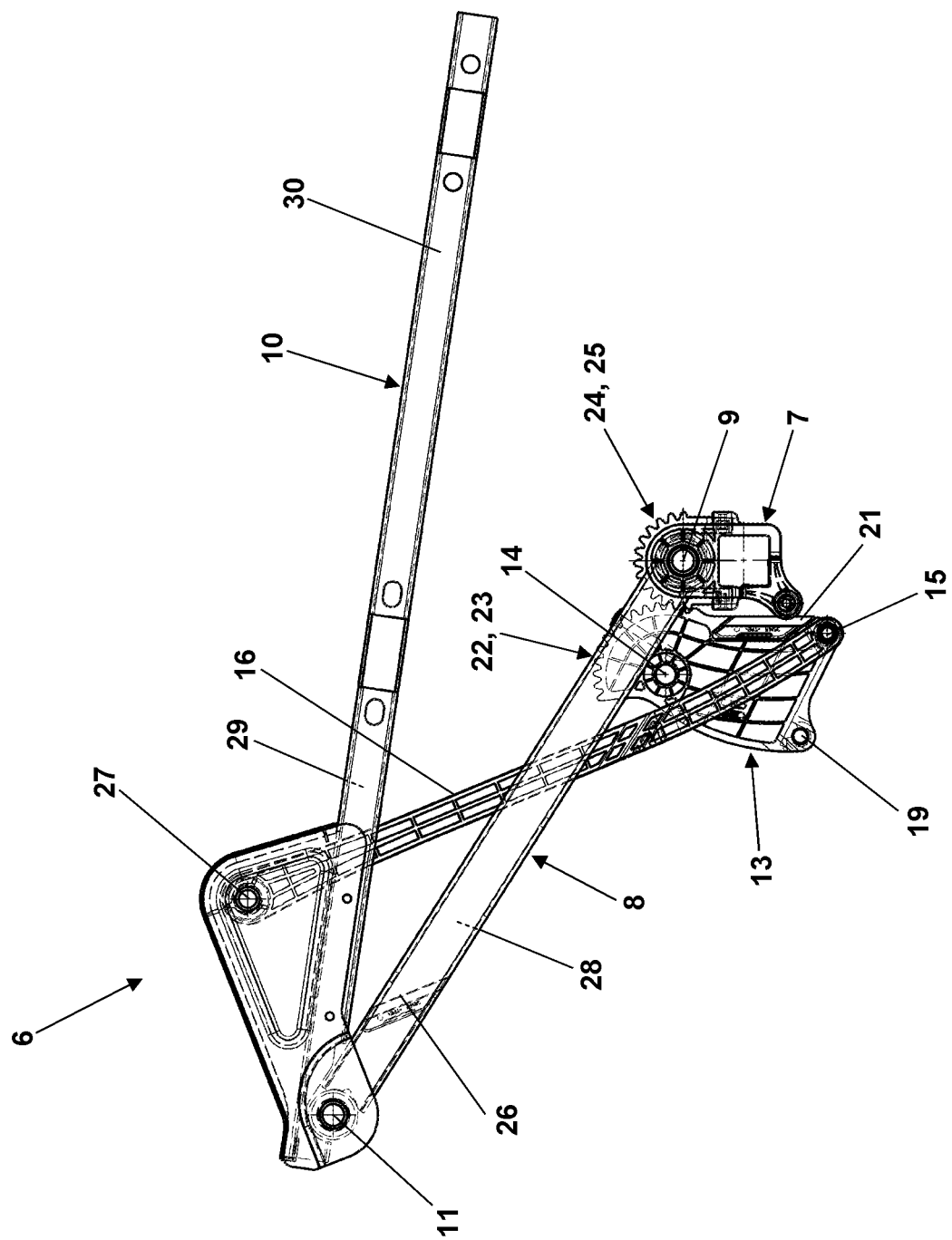
FIG. 4 is a view corresponding to FIG. 3 of the same fitting unit in the same pulled-out position, in which, for illustrating the function, covered lines are also depicted.
Figure 5:
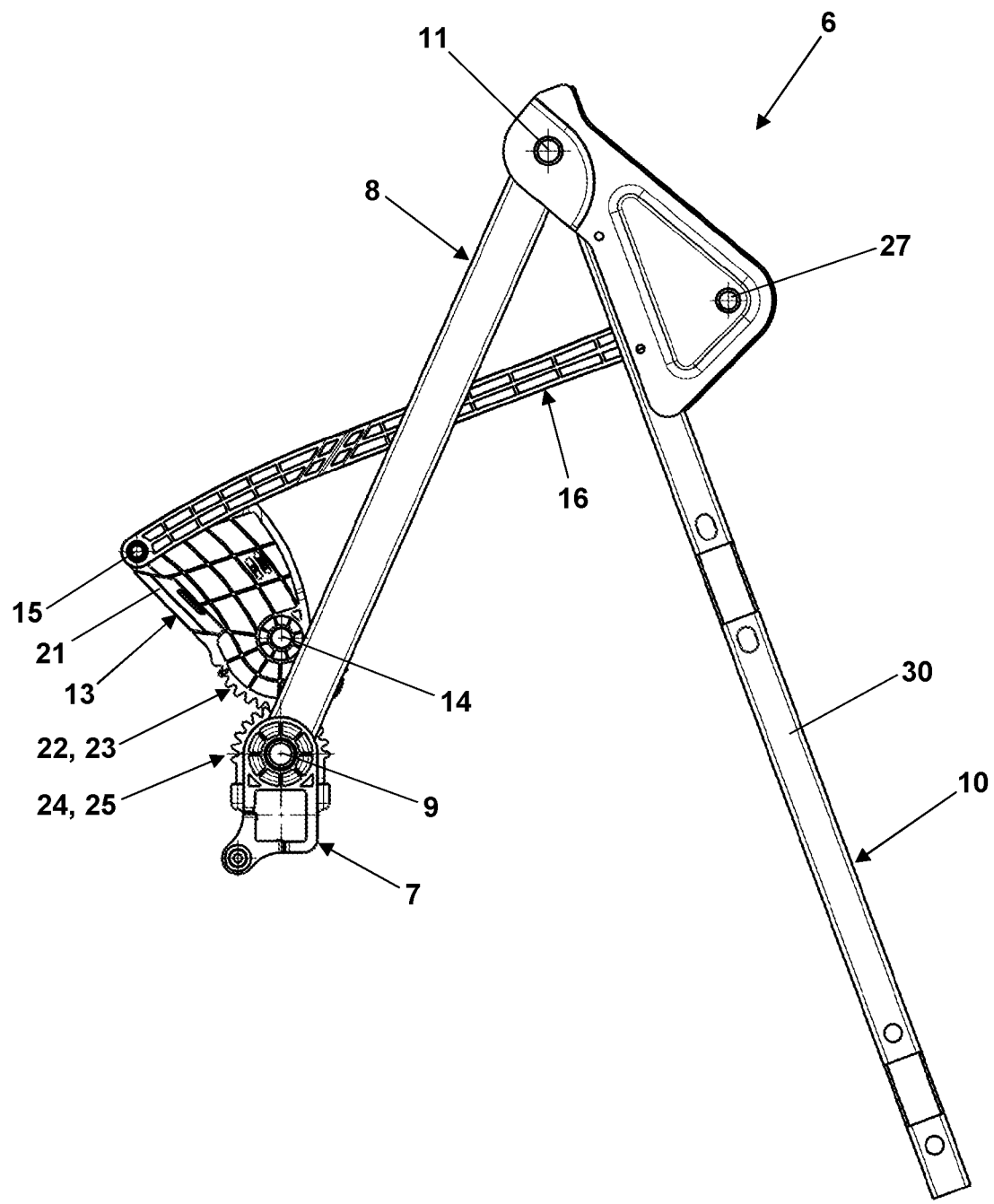
FIG. 5 is a top view corresponding to FIG. 3 of a fitting unit in an intermediate position between the positions of the two fitting units in the FIGS. 1 and 2.
Figure 6:
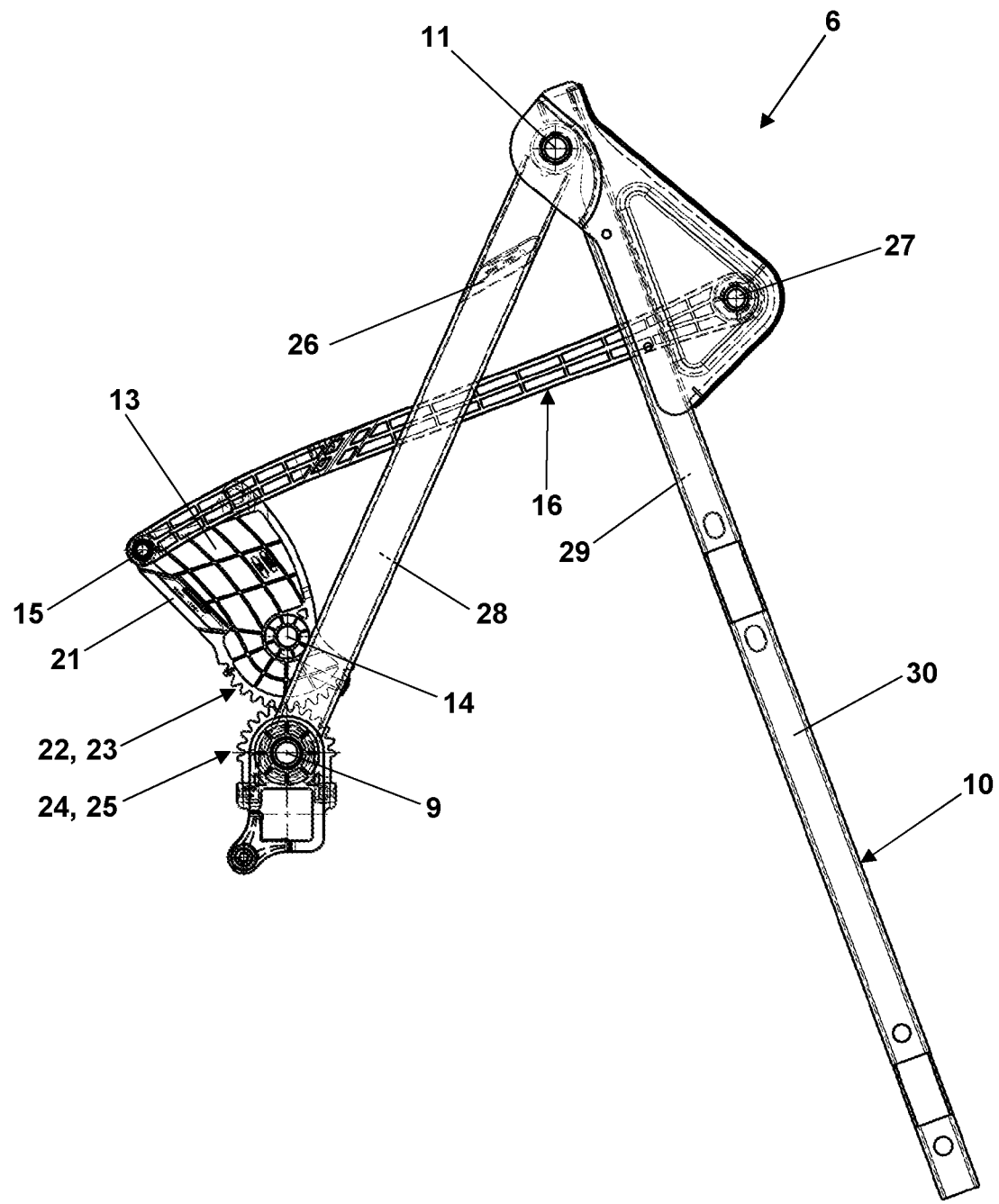
FIG. 6 is a view according to FIG. 4 of the fitting unit in the intermediate position according to FIG. 5.

This coupling is depicted in FIGS. 3 to 8. Here, always only one fitting unit 6 with the associated bearing pedestal 7, the supporting arm 8, the shelf carrier 10, the lever element 13 and the control lever 16 is depicted. FIGS. 3 and 4, which show the maximally pivoted-in position of the fitting unit 6, show that the lever element 13 abuts at the bearing pedestal 7 via a stop 21, and, with a rolling element 22 in form of a gearwheel segment 23 rotating with the hinge points 15 and 19 about the rolling axis 14, engages a rolling element 24 which is a further gearwheel segment 25 fixedly mounted to the bearing pedestal 7 and extending around the first vertical pivot axis 9. In other words, the two gearwheel segments 23 and 25 engage each other and thus couple the pivoting movement of the supporting arm 8 about the first vertical pivot axis 9 to the pivoting movement of the shelf carrier 10 about the second vertical pivot axis 11 by means of the previously described four-joint arrangement. Here, an about 50% longer radius of the rolling element 22 as compared to the rolling element 24 serves for the lever element 13 moving at a lower angular velocity with regard to the supporting arm 8 than the supporting arm 8 with regard to the bearing pedestal 7. The rolling elements 22 and 24 rolling on one another define a certain angle of the lever element 13 with regard to the supporting arm 8 and thus a certain position of the entire four-joint-arrangement in each pivot position of the support arm 8 about the first vertical pivot axis 9. In this way, the two pivoting movements of the supporting arm 8 about the first vertical pivot axis 9 and the shelf carrier 10 about the second vertical pivot axis 11 are coupled in a completely defined way.

FIGS. 5 to 8 show the further pivoting-out of the fitting unit 6 until the control lever 16 at the end of the opening 28 of the support arm 8 neighboring the pivot axis 11 abuts against a stop 26. The stop 26 may be identically constructed of elastic material as the stop 21. Until it reaches the corresponding pivot position according to FIGS. 7 and 8, the supporting arm 8 has covered an angle of about 135° around the first vertical pivot axis 9. At the same time, the pivot lever 13 has covered an angle of about 90° with regard to the supporting arm 8. During this, the hinge point 15 of the control lever 16 has moved from that side of the supporting column 2 located in the corner cabinet far into that side of the supporting column which is located behind the door opening, and it has, thus, wide opened the angle between the shelf carrier 10 and the supporting arm 8. As a result, the shelf fastened to the shelf carrier 10 gets far in front of the door opening of the corner cabinet. Further, despite its large dimensions it does not collide with the corner cabinet.

Figure 7:
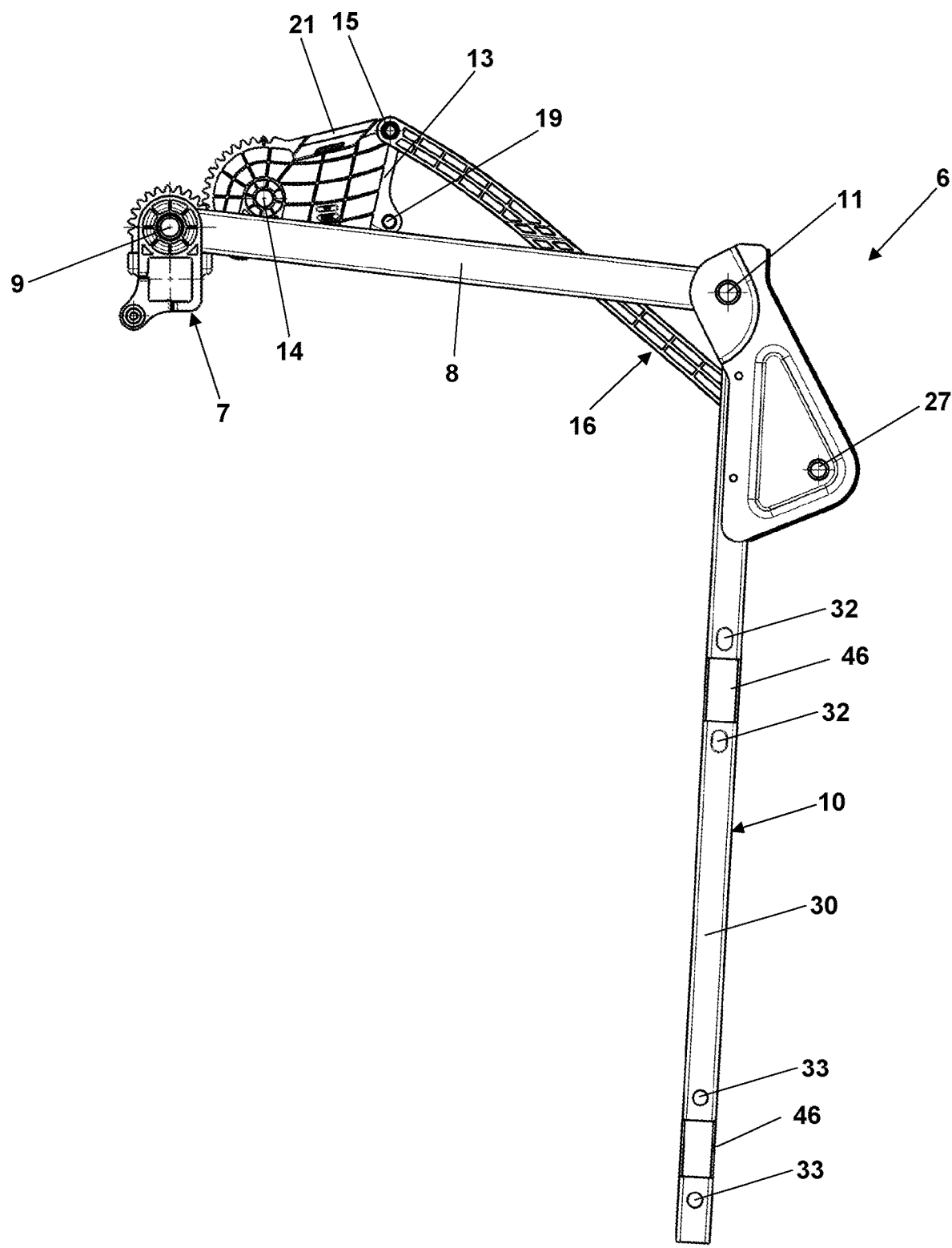
FIG. 7 is a view corresponding to FIGS. 3 and 5 of the pulled-out fitting unit according to FIGS. 1 and 2.
Figure 8:
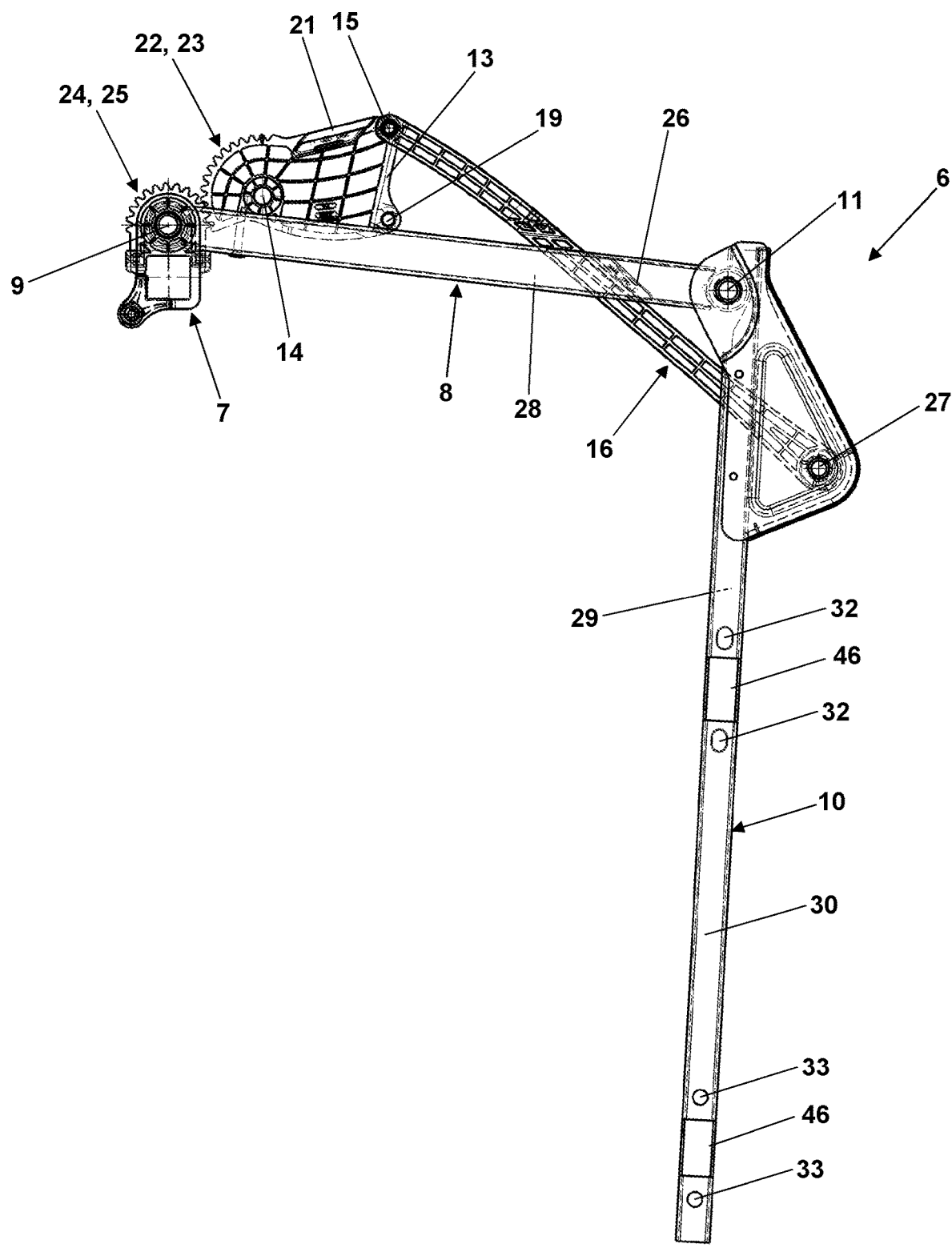
FIG. 8 is the view corresponding to FIGS. 4 and 6 of the pulled-out fitting unit according to FIG. 7.
Figure 9:
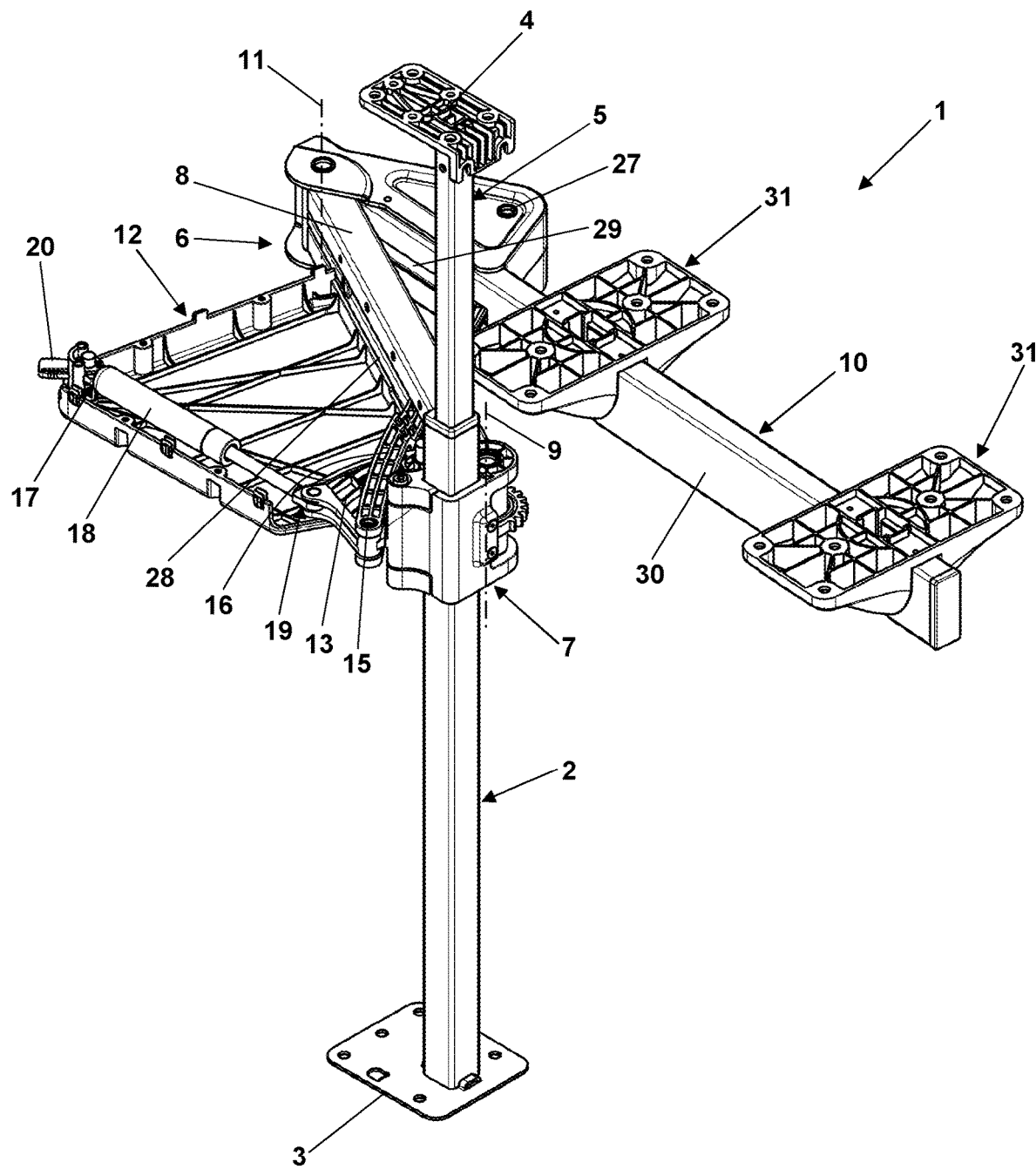
FIG. 9 is a perspective view of a corner cabinet fitting according to the invention with only one fitting unit including a bearing pedestal, a supporting arm and a shelf carrier, wherein the fitting unit is depicted in a pushed-in position with opened housing, and wherein shelf rests mounted to the shelf carrier are depicted.

FIG. 9 which shows the corner cabinet fitting 1 with only one fitting unit and the supporting column 2 additionally depicts shelf rests 31 mounted to the main beam 30 of the shelf carrier 10, which engage into corresponding fastening holes 46 and guiding holes 32 and 33, respectively (see FIGS. 7 and 8). The shelf rests 31 releasably snap in the fastening holes 46 in vertical direction by means of snap-in protrusions engaging into lateral snap-in holes 47 (see FIGS. 1, 2 and 10). The guiding holes 32 are made as elongated holes in the main beam 30 so that the shelf rests 31 engaging therein with round guiding bolts is a floating bearing in direction of the main beam 30, whereas the shelf rest 31 engaging into the fastening holes 33 which are made as round holes with fitting round guiding bolts is a fixed bearing.

Figure 10:
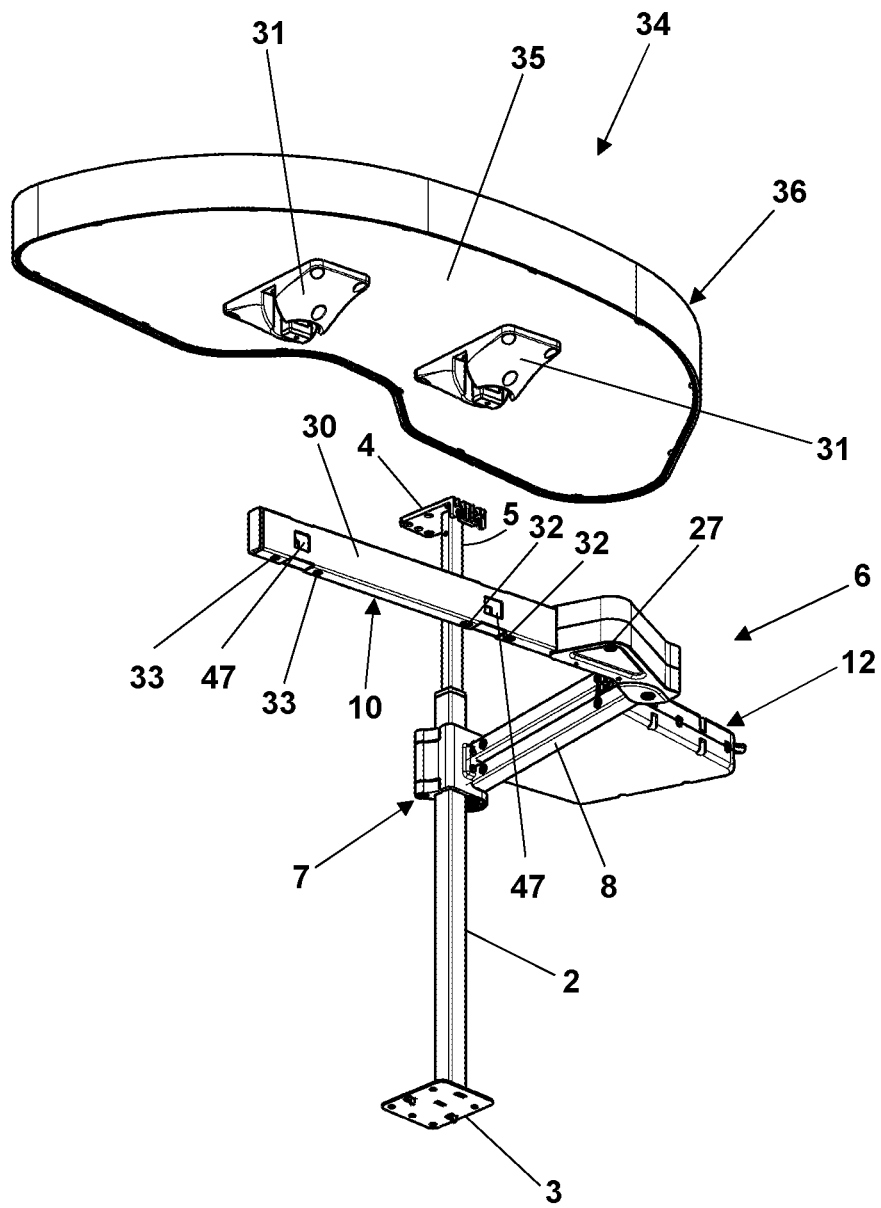
FIG. 10 shows the corner cabinet fitting according to FIG. 9 with a pulled-out fitting unit prior to fixing a shelf to which the shelf rests are screwed.
Figure 11:
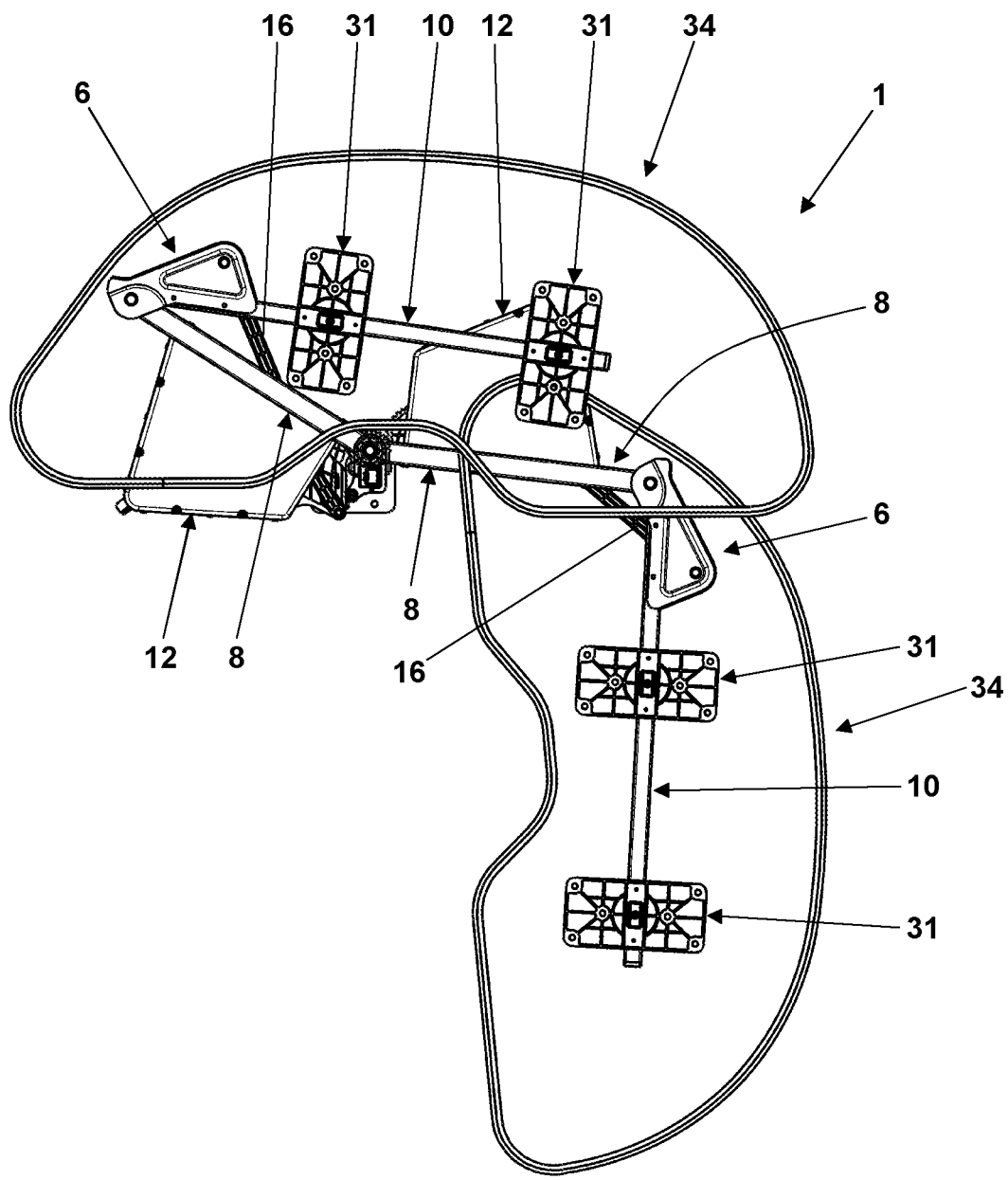
FIG. 11 is a top view of the corner cabinet fitting according to FIGS. 1 and 2 with shelves fastened to the shelf carrier via shelf rests, the boards of the shelves being omitted.
Figure 12:
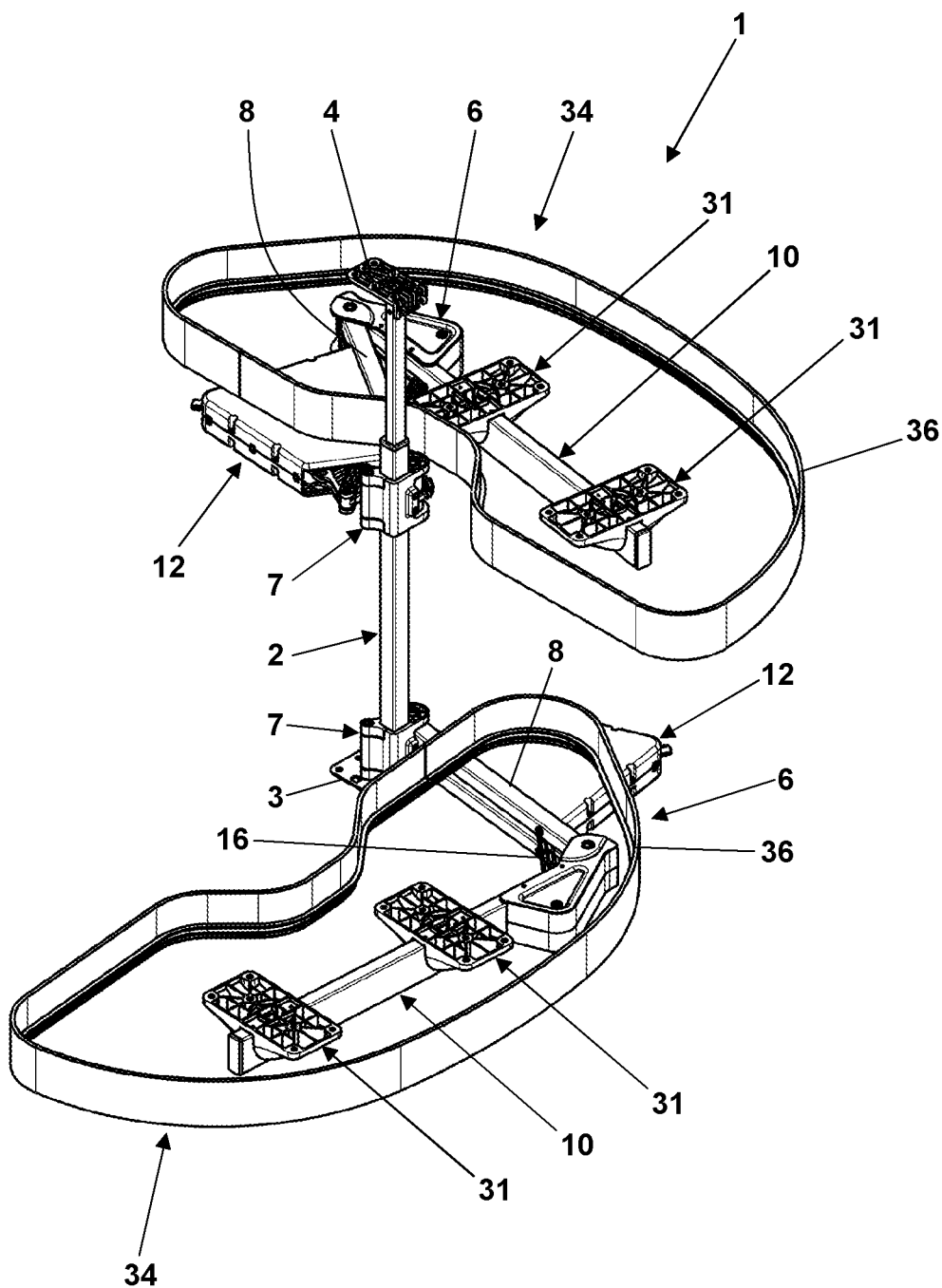
FIG. 12 is a perspective view of the corner cabinet fitting according to FIG. 11, once again with omitted boards of the shelves.

FIG. 10, in a perspective view from below, shows the shelf rests 31 screwed to a shelf 34 having a board 35 and a rim 36 in the area of the board 35 prior to connecting the shelf rest to the main beam 30 of the shelf carrier 10 for fastening the shelf 34 to the fitting unit 6. FIGS. 11 and 12, in two perspective views, show the corner cabinet fitting 1 with two fitting units 6 equipped with shelves 34, wherein the boards 35 of the shelves are omitted to provide a free view on the fitting unit 6. The FIGS. 11 and 12 clearly show how far the respective shelf 34 moves forward when the associated fitting unit 6 is moved out of its completely pivoted-in pivot position into its completely pivoted-out pivot position. The intersecting surface area in between the two positions of the shelf 34 which can be seen from FIG. 11 is only small. This is equivalent to that the shelf 34 can nearly completely be pulled out in front of the door opening of the respective corner cabinet.

Figure 13:
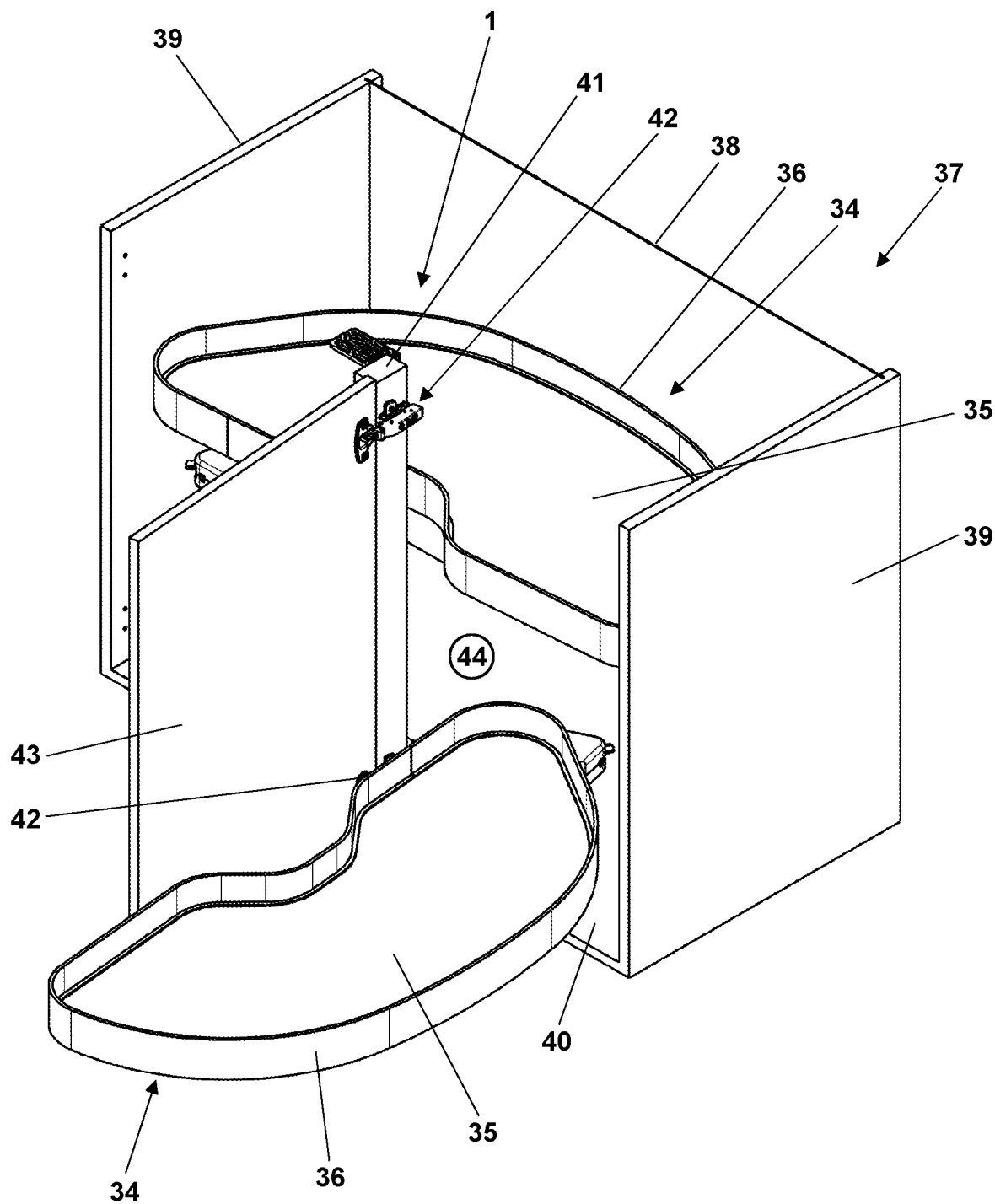
FIG. 13 is a perspective view of the corner cabinet fitting according to FIGS. 11 and 12 including the boards of the shelves and mounted in a corner cabinet.
Figure 14:
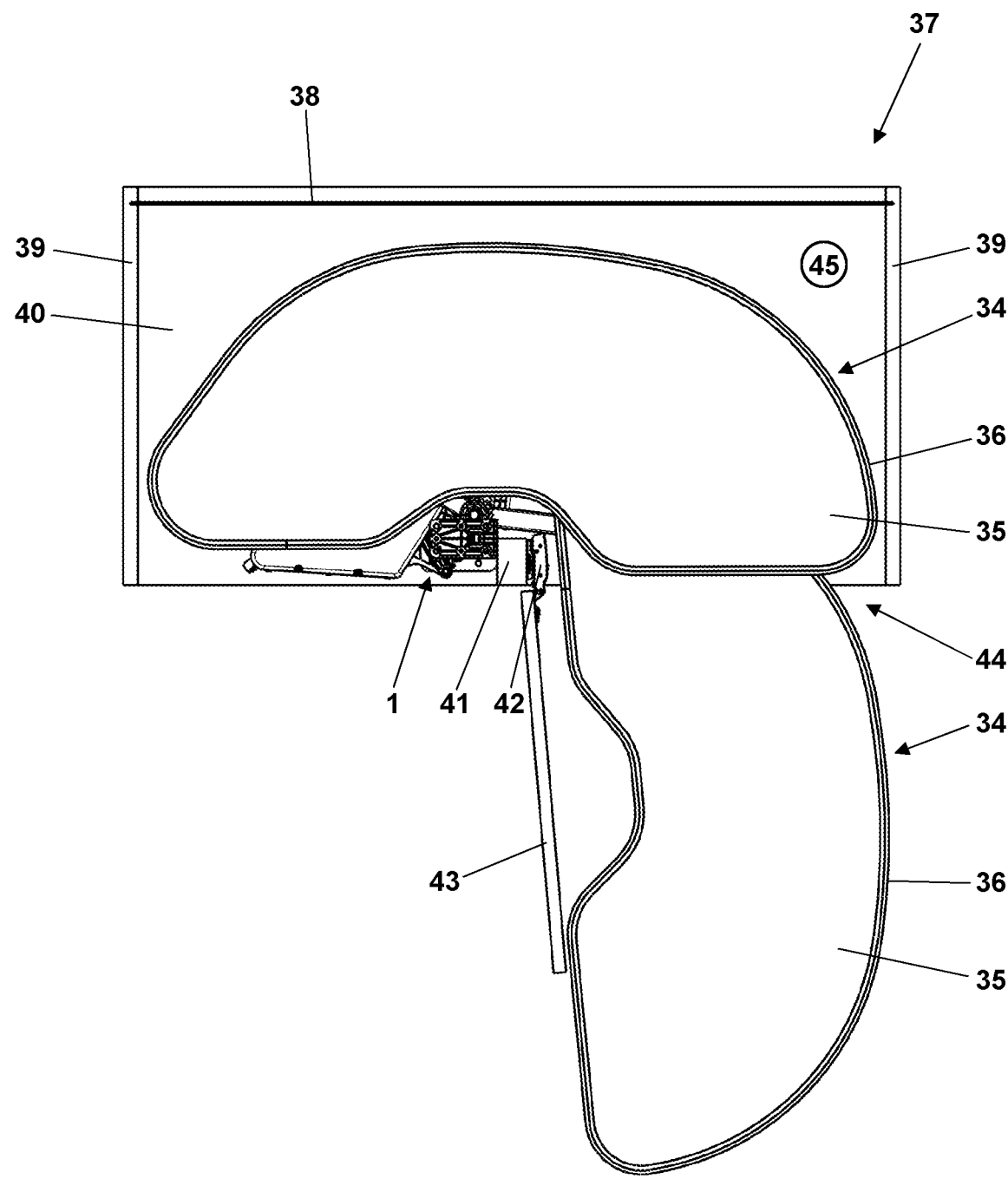
FIG. 14 is a top view of the corner cabinet comprising the corner cabinet fitting according to FIG. 13.

Finally, FIGS. 13 and 14 show a corner cabinet 37 comprising a body including a back wall 38, side walls 39, a bottom 40, and a vertical beam 41 and further comprising a door 43 mounted to the vertical beam via hinges 42 such as to be pivotable open for voluntarily opening and closing the door opening 44. The corner cabinet 37 is depicted with opened door opening 44 beyond which the lower shelf 34 is nearly completely pulled out of the corner cabinet 37, whereas the upper shelf 34 is pushed into the corner cabinet 37. FIG. 13 shows that the supporting column of the corner cabinet fitting 1 is arranged on that side of the vertical beam 41 facing away from the door opening 24 in a covered way. FIG. 14 makes clear that the shelves 34 as compared to the base area 45 of the corner cabinet 37 are of a very large surface area and can nevertheless be pulled for very large parts out of the corner cabinet 37 beyond the door opening 44.

Many variations and modifications may be made to the preferred embodiments of the invention without departing substantially from the spirit and principles of the invention. All such modifications and variations are intended to be included herein within the scope of the present invention, as defined by the following claims.

We claim:

1. A corner cabinet fitting for movably mounting a shelf in a corner cabinet, the corner cabinet fitting comprising
a bearing pedestal,
a supporting arm mounted to the bearing pedestal such as to be pivotable in a first pivoting movement about a first vertical pivot axis,
a shelf carrier mounted to the supporting arm such as to be pivotable in a second pivoting movement about a second vertical pivot axis, and
a coupling mechanism which couples the second pivoting movement to the first pivoting movement,
wherein the coupling mechanism includes a first rolling element and a second rolling element, which roll on one another either directly or via a belt, a chain or a rod, the first rolling element being coupled to the bearing pedestal, and the second rolling element being coupled to the shelf carrier.

2. The corner cabinet fitting of claim 1, wherein the bearing pedestal is mounted to a vertical supporting column such that it can be clamped to the supporting column at different heights.

3. The corner cabinet fitting of claim 1, wherein the shelf carrier comprises a plurality of shelf rests arranged at a distance with regard to each other, wherein one of the shelf rests is made as a fixed bearing fixed to the shelf carrier.

4. The corner cabinet fitting of claim 3, wherein all other of the shelf rests despite the one of the shelf rests are made as floating bearings movable in a longitudinal direction of the shelf carrier.

5. A corner cabinet fitting for movably mounting a shelf in a corner cabinet, the corner cabinet fitting comprising
a bearing pedestal,
a supporting arm mounted to the bearing pedestal such as to be pivotable in a first pivoting movement about a first vertical pivot axis,
a shelf carrier mounted to the supporting arm such as to be pivotable in a second pivoting movement about a second vertical pivot axis, and
a coupling mechanism which couples the second pivoting movement to the first pivoting movement,
wherein the coupling mechanism includes a first rolling element and a second rolling element, which roll on one another either directly or via a belt, a chain or a rod, the first rolling element being coupled to the bearing pedestal, and the second rolling element being coupled to the shelf carrier,
wherein the first and second rolling elements are two toothed disc segments or two gearwheel segments.

6. The corner cabinet fitting of claim 5, wherein the first rolling element is rigidly fixed to the bearing pedestal, and the second rolling element is mounted to the supporting arm such as to be pivotable about a vertical rolling axis.

7. The corner cabinet fitting of claim 6 and further comprising a control lever having a first lever end and a second lever end, that is hinged, with its first lever end, to a first hinge point which, together with the second rolling element, pivots about the rolling axis of the second rolling element, and, with its second lever end, to a second hinge point which, together with the shelf carrier, pivots about the second pivot axis.

8. The corner cabinet fitting of claim 7, wherein the control lever crosses the supporting arm.

9. The corner cabinet fitting of claim 8, wherein the control lever extends through an opening in the supporting arm.

10. The corner cabinet fitting of claim 9, wherein the control lever, up to the second hinge point, extends through a further opening in a main beam of the shelf carrier.

11. The corner cabinet fitting of claim 7,
wherein the control lever between its first and second hinge points is 0.5 to 2 times as long as the supporting arm between the rolling axis of the second rolling element and the second pivot axis;
wherein a first distance of the first hinge point of the control lever to the rolling axis of the second rolling element is 0.5 to 2 times as long as a second distance of the second hinge point of the control lever to the second pivot axis;
wherein the supporting arm between the rolling axis of the second rolling element and the second pivot axis is 2 to 5 times as long as the first distance of the first hinge point of the control lever to the rolling axis of the other rolling element of the two rolling elements; and
wherein the control lever between its first and second hinge points is 2 to 5 times as long as the second distance of its second hinge point to the second pivot axis.

12. The corner cabinet fitting of claim 7, wherein a first distance of the first hinge point of the control lever to the rolling axis of the second rolling element is by 50to 200% longer than a first radius of the second rolling element from its rolling axis.

13. The corner cabinet fitting of claim 5, wherein the second rolling element has a first radius from its rolling axis which is by up to 200% longer than a second radius of the first rolling element from the first vertical pivot axis.

14. The corner cabinet fitting of claim 13, wherein the first radius is by 20 to 100% longer than the second radius.

15. The corner cabinet fitting of claim 5, wherein each of the first and second rolling elements has a constant radius.

16. A corner cabinet fitting for movably mounting a shelf in a corner cabinet, the corner cabinet fitting comprising
a bearing pedestal,
a supporting arm mounted to the bearing pedestal such as to be pivotable in a first pivoting movement about a first vertical pivot axis,
a shelf carrier mounted to the supporting arm such as to be pivotable in a second pivoting movement about a second vertical pivot axis, and
a coupling mechanism which couples the second pivoting movement to the first pivoting movement,
wherein the coupling mechanism includes a first rolling element and a second rolling element, which roll on one another either directly or via a belt, a chain or a rod, the first rolling element being coupled to the bearing pedestal, and the second rolling element being coupled to the shelf carrier, and
further comprising a linear spring and damping device having a first device end and a second device end is hinged, with its first device end, to a third hinge point which pivots together with the supporting arm about the first pivot axis, and, with its second device end, to a fourth hinge point which together with the second rolling element pivots about the rolling axis of the second rolling element, wherein a third distance between the third hinge point and the fourth hinge point runs through an extremum during the first pivoting movement.

17. The corner cabinet fitting of claim 16, wherein the linear spring and damping device is essentially orientated horizontally and, together with the second rolling element, arranged in a housing attached to the supporting arm.

18. The corner cabinet fitting of claim 17, wherein the third hinge point, at least in a pushed-in base position of the corner cabinet fitting, is raised or raisable in position by at least 2 mm with regard to the fourth hinge point.

19. A corner cabinet comprising
a cabinet body;
a corner cabinet fitting including at least one fitting unit comprising
a bearing pedestal,
a supporting arm mounted to the bearing pedestal such as to be pivotable in a first pivoting movement about a first vertical pivot axis,
a shelf carrier mounted to the supporting arm such as to be pivotable in a second pivoting movement about a second vertical pivot axis, and
a coupling mechanism which couples the second pivoting movement to the first pivoting movement; and
at least one shelf fastened to the shelf carrier of the at least one fitting unit;
wherein the coupling mechanism of the at least one fitting unit includes a first rolling element and a second rolling element, which roll on one another either directly or via a belt, a chain or a rod, the first rolling element being coupled to the bearing pedestal, and the second rolling element being coupled to the shelf carrier,
wherein the first and second rolling elements are two toothed disc segments or two gearwheel segments.

20. The corner cabinet of claim 19, wherein, in the at least one fitting unit, the first rolling element is rigidly fixed to the bearing pedestal, and the second rolling element is mounted to the supporting arm such as to be pivotable about a vertical rolling axis, and wherein the at least one fitting unit further comprises a control lever having a first lever end and a second lever end, that is hinged, with its first lever end, to a first hinge point which, together with the second rolling element, pivots about the rolling axis of the second rolling element, and, with its second lever end, to a second hinge point which, together with the shelf carrier, pivots about the second pivot axis.

* * * * *